UNITED STATES PATENT OFFICE 2,432,221

MOLDING MATERIALS

Galen J. Wilson, Dayton, Ohio, assignor to The National Cash Register Company, Dayton, Ohio, a corporation of Maryland No Drawing. Application November 30, 1944, Serial No. 566,029

6 Claims. (Cl. 260—722)

This invention relates to molding material consisting of a continuous coagulum phase of rubber, either natural or synthetic, containing vulcanizing ingredients, said rubber phase being charged with micro-fine particles of an inert leachable filler material resistant to molding and vulcanizing operations.

The molding material disclosed herein is suitable for use in molding and vulcanizing objects which are to be leached to make them porous.

The maximum porosity in a molded and vulcanized rubber object, made by leaching a filler therefrom, requires that all of the inert and leachable material be removed in the leaching process; that the amount of filler used be the most that can be incorporated in the rubber without leaving the remaining vulcanized rubber network in a discontinuous or friable state; and that the filler be evenly distributed throughout the rubber.

The percentages of the different ingredients must be carefully computed to make such a molding material. It has been found that it is impractical to compound the ingredients just before each molding process, as it is too time-consuming and subject to human error, which results in each molded object's having its own distinctive characteristics of porosity and structural stability.

Normally, roller mill compounded rubbers are used to create uniform batches of raw rubber molding material, but such milled compounds cannot be used in making porous objects. Uncured rubber compounded on a roller mill with granular leachable material is unsuitable for making porous vulcanized rubber objects, as, in some way, the filler particles are affected in such a manner by the grinding and squeezing with the rubber that they cannot be completely leached out.

Porous rubber has been made successfully by comminuting uncured rubber, containing vulcanizing ingredients, and intermingling the same with leachable granular filler material. However, large batches of such intermingled ingredients cannot be kept, as the rubber particles tend to coalesce, after a short time, disturbing the uniform characteristics as far as the even dispersion of the filler is concerned.

This invention provides molding material which can be made in large batches, which can be handled and cut to size, and which withstands aging. The objects made from a particular batch will be equally porous when leached and have the same structural stability, even if molded at widely spaced intervals of time.

By "coagulum" is meant the physical state of rubber in a continuous uniform solid gummy structure, as distinguished from an aggregate structure such as that which would be formed by compacted particles. The invention provides that such a coagulum act as a continuous network phase for the holding of leachable inert filler substance in a stable dispersed condition.

This invention, therefore, has as its principal object the provision of a molding material consisting of a continuous coagulum network of vulcanizable rubber having dispersed in the network particles of a leachable filler material.

Another object of the invention is to provide such a coagulum filled with micro-fine leachable substance, inert as to molding and vulcanizing operations, in an amount sufficient to insure complete leachability of the filler from an article subsequently molded from it and vulcanized.

The uncured vulcanizable rubber coagulum containing the filler must be composed of certain proportions of rubber and filler, so that, when the final molded product is made, the filler may be reached by the leaching agent. Too little filler results in some being walled off by the rubber and not removable. On the other hand, the composition must not contain too much filler, as the object will not hold together.

Certain volumetric proportions must be considered as the basis for the optimum structure, because the physical consideration of a molded object having a continuous network of rubber filled with a maximum amount of solid particles of filler, all in a substantially continuous mass contact, resolves itself into a problem of the relative volumes of rubber and filler in the space occupied by their combined mass. The volume of the molding material or filler may change in the molding and vulcanizing process, and hence the optimum values must be in terms of the volume of the final molded and vulcanized product.

It has been found that approximately from 42% to 74% of the volume of the finally molded product should be filler and the remainder rubber.

In a typical example of uncured rubber coagulum containing the maximum amount of filler, wherein the rubber is a copolymer of butadiene and acrylonitrile, and the filler is sodium nitrate, 100 grams of such rubber may be used with approximately 570 grams of finely divided sodium nitrate.

Rubber coagula are commonly made by separating the rubber from a fluid solution, and filler substances in proper proportion may be added to and dispersed in any such fluid to separate out with the rubber to form the product claimed. The process for making such molding material from a fluid solution of rubber and solvent is fully set forth in my co-pending application for United States Letters Patent Serial No. 565,912, filed November 30, 1944.

It is considered that the maximum particle sizes of the filler substance should pass a screen of 100 lines to the linear inch if a truly microporous product is desired.

The filler is chosen from substances which may be comminuted to the required fineness, which are inert as to the rubber, which are relatively incompressible, which will not be affected by molding pressures or curing temperatures, and which may be leached by solvents not affecting the rubber.

The molding material disclosed herein is particularly useful in making microporous objects, in which the pores are interconnecting and unperceivable to the unaided eye, and in making objects which, when rendered porous, tenaciously hold a high percentage of fluids by capillary action.

While the form of the invention disclosed herein is admirably adapted to fulfill the objects primarily stated, it is to be understood that it is not intended to confine the invention to the one form or embodiment disclosed herein, for it is susceptible of embodiment in various forms all coming within the scope of the claims which follow.

What is claimed is:

1. A raw-stock member of molding material consisting of a single piece continuous phase coagulum of unvulcanized rubber having dispersed therein particles of a solid leachable substance inert as to the rubber, not affected by molding or vulcanization, in an amount to insure that the articles molded therefrom, and vulcanized, contain between 26% and 58% of rubber by volume, said coagulum having been obtained from a liquid mixture of rubber and particles of leachable substance.

2. A raw-stock member which may be molded, said member consisting of a continuous phase unitary network coagulum of unvulcanized rubber having dispersed therein micro-fine particles of a solid leachable substance inert as to the rubber, not affected by molding or vulcanization, in an amount to insure that articles molded therefrom contain between 26% and 58% of rubber by volume, said coagulum having been obtained from a liquid mixture of rubber and particles of leachable substance.

3. A raw-stock moldable member consisting of a cast unitary continuous phase coagulum of unvulcanized rubber having dispersed therein micro-fine sodium nitrate particles in an amount to insure that articles molded therefrom contain between 26% and 58% of rubber by volume, said coagulum having been obtained from a liquid mixture of rubber and particles of sodium nitrate.

4. A raw-stock moldable member consisting of a unitary continuous phase coagulum of unvulcanized rubber having dispersed therein granules of sodium nitrate passing a screen of 100 wires to the inch or less, in an amount to insure that articles molded therefrom contain between 26% and 58% of rubber by volume, said coagulum having been obtained from a liquid mixture of rubber and particles of sodium nitrate.

5. A raw-stock moldable member consisting of a unitary continuous phase coagulum of an unvulcanized copolymer of butadiene acrylonitrile in which are dispersed micro-fine particles of sodium nitrate, said coagulum having been obtained from a fluid mixture of the copolymer of butadiene acrylonitrile and sodium nitrate particles.

6. A raw-stock moldable member consisting of a single-piece, continuous phase coagulum of a copolymer of butadiene and acrylonitrile containing vulcanizing ingredients in which are dispersed micro-fine particles of sodium nitrate in an amount to constitute between 42% and 74% by volume of the whole mass, said coagulum having been obtained from a fluid mixture of the copolymer of butadiene acrylonitrile and sodium nitrate particles.

GALEN J. WILSON.

REFERENCES CITED

The following references are of record in the file of this patent:

UNITED STATES PATENTS

| Number | Name | Date |
|---|---|---|
| 2,006,687 | Riddoch | July 2, 1935 |
| 2,175,798 | Hauser | Oct. 10, 1939 |
| 2,185,586 | Brooks | Jan. 2, 1940 |
| 2,332,514 | Holtzclaw | Oct. 26, 1943 |
| 2,353,877 | Chollar | July 18, 1944 |
| 1,204,697 | Schermerhorn | Nov. 14, 1916 |